United States Patent Office 3,398,256
Patented Aug. 20, 1968

3,398,256
WELDING METHOD AND ELECTRODE
William R. Foley, Jr., Allison Park, Pa., assignor to The McKay Company, Pittsburgh, Pa., a corporation of Pennsylvania
No Drawing. Filed Oct. 14, 1965, Ser. No. 496,151
6 Claims. (Cl. 219—146)

This invention relates to a welding method and electrode. It relates more particularly to a welding method and electrode for forming a nickel base weld deposit containing titanium carbide precipitated in situ for improved wear resistance. The present invention is in some respects an extension of or improvement over the invention of my copending application Ser. No. 288,075, now Patent Number 3,231,709, filed June 17, 1963.

As disclosed in my said copending application, the presence of titanium carbide crystals precipitated in situ in a solidifying weld deposit greatly improves the wear resistance of the deposit if the amount of titanium carbide is greater than about 1% by weight of the weld deposit. My said copending application deals with ferrous weld metal matrices for containing the titanium carbide and discloses that titanium carbide particles can be crystallized in situ in a carbon-containing ferrous weld metal pool by introducing into the reaction zone a component comprising at least one of the materials of the group consisting of titanium, titanium alloy and oxide of titanium, along or combined with another oxide, such component containing titanium in an amount equal to between about 1% and about 22% by weight of the electrode metal, and thereby forming titanium carbide particles by crystallization in situ in the solidifying weld metal which forms the matrix and maintaining in the reaction zone an amount of carbon at least equal to the total of (1) the amount of carbon required to form the titanium carbide particles plus (2) the amount of carbon required to satisfy the carbon demands of the matrix plus (3) the amount of carbon required to reduce titanium oxide and other metal oxides reducible by carbon if present plus (4) the amount of carbon required to combine with oxygen derived from the reaction zone atmosphere, such total amount of carbon being equal to between about 1.1% and about 17% by weight of the electrode metal. In my said copending application as well as in this application electrode metal is defined as the sum of the carbon and the metallic components either present in the electrode or recoverable from compounds present in it, and for simplicity in calculations the electrode metal weight is taken as equal to the deposit metal weight.

For use in the hard facing of nickel and of high nickel alloys it would be desirable to use nickel as a matrix material for hard facing weld deposits containing crystals of titanium carbide. Such deposits would combine the best properties of nickel deposits such as corrosion, high temperature and oxidation resistance together with the superior wear resistance conferred by the presence of titanium carbide in a weld deposit. However, I have not found it possible to form a weld deposit containing crystals of titanium carbide precipitated in situ in a matrix consisting only of nickel. This is due to the fact that carbon has a very low solubility in nickel. Thus if the directions for forming a titanium carbide containing deposit as given above and in my said copending application are applied in the hard facing of nickel the resulting weld deposit does not contain titanium carbide crystals in a nickel matrix but rather contains free graphite, which was rejected from the nickel, in a matrix which presumably consists of a nickel-titanium alloy.

I have discovered that by introducing into the weld reaction zone relatively small amounts of certain carbide forming materials in certain amounts as hereinafter disclosed the solubility of the nickel weld metal pool can be altered so that it will dissolve both carbon and titanium in the amounts necessary for the precipitation of titanium carbide crystals in situ. Using this discovery in conjunction with the invention of my said copending application, I can form a nickel base weld deposit containing titanium carbide precipitated in situ for improved wear resistance. By so doing I retain substantially all the advantages of the supporting weld deposit such as high temperature strength and corrosion resistance while the wear resisting qualities of titanium carbide are added to deliver extra service life.

I provide a method of forming a wear-resistant weld deposit comprising forming in an arc welding reaction zone a nickel base weld metal pool, introducing into the reaction zone a component comprising at least one of the materials of the group consisting of titanium, titanium alloy, titanium carbide and oxide of titanium, alone or combined with another oxide, such component containing titanium in an amount between about .8% and about 16% by weight of the weld deposit, introducing into the reaction zone a carbide forming material in an amount sufficient to render both carbon and titanium soluble in the nickel, said carbide forming material comprising at least one of the materials of the group consisting of chromium, iron, manganese, molybdenum, tungsten, vanadium, columbium and silicon in an amount sufficient to produce a carbide former equivalent of at least 3% by weight of the weld deposit and maintaining in the reaction zone an amount of carbon at least equal to the total of (1) the amount of carbon required to form the titanium carbide particles plus (2) the amount of carbon required to reduce titanium oxide and other metal oxides reducible by carbon if present plus (3) the amount of carbon required to combine with oxygen derived from the reaction zone atmosphere and thereby forming titanium carbide particles by crystallization in situ in the solidifying weld metal which forms the matrix. As indicated above and in my said copending application, the titanium is introduced into the reaction zone in an amount equal to between about .8% and about 16% of the weight of the weld deposit and because the recovery efficiency factor for titanium is about 75%, the electrode contains titanium in an amount equal to between about 1% and about 22% of the electrode metal weight. The amount of carbon is preferably equal to between about .2% and about 4% by weight of the weld deposit. Because carbon may be required for reduction purposes as well as for deposit formation, and because the efficiency factor varies from about 90% to about 30% at low carbon levels, the total amount of carbon in the electrode is preferably equal to between about .7% and about 12% by weight of the electrode metal. It should be noted that in contrast to the ferrous weld deposit described in my said copending application little or no carbon is required to satisfy the demands of a nickel matrix; this factor is accordingly disregarded. The total amount of carbide forming materials necessary to form an alloy with the nickel weld metal pool which will dissolve both carbon and titanium so as to allow the titanium carbide to precipitate in situ in the solidifying matrix is dependent on the specific carbide forming element or elements used; the amount required appears to decrease as the free energy of formation of the carbide of the element decreases or becomes more negative. Moreover, the effect of the carbide forming elements on the solubility of carbon in the nickel base pool is an additive one, i.e., small amounts of several such elements may be used instead of a single element to achieve the desired carbon solubility in the weld metal pool. For that reason computations of the total amount of carbide formers required must include what I have chosen to call the carbide former equivalent (CFE), which expresses in mathematical form the relationship between the various individual carbide formers in terms of their effect on solubility for carbon in the resulting alloy weld metal pool. Adequate solubility for carbon and titanium in the pool can be obtained if the carbide formers are added in amounts satisfying the following requirements:

| | Maximum percentage by weight of weld deposit |
|---|---|
| Chromium | 35 |
| Iron | 40 |
| Manganese | 20 |
| Molybdenum | 10 |
| Tungsten | 10 |
| Vanadium | 10 |
| Columbium | 10 |
| Silicon | 12 | provided that the CFE calculated in accordance with the following formula is at least 3:

CFE=percent Cr+percent Mo+percent W+percent Cb+.3×percent Fe+.6×percent Mn+.6×percent Si+1.5×percent V If the efficiency of transfer of the carbide formers from the electrode to the deposit is taken at unity then the carbide former equivalent minimum value is also 3% of the weld deposit.

The titanium should be introduced into the reaction zone as a component comprising at least one of the materials of the group consisting of titanium, titanium alloy, titanium carbide and oxide of titanium, alone or combined with another oxide. Carbon can be provided as amorphous or graphitic carbon or as part of one or more carbides. The carbide formers can be supplied to the arc either in metallic form or as alloys with nickel or with each other. Preferably they are in finely divided form and are put in the electrode coating if a coated electrode is used, in the fill of a bare composite tubular electrode or in either or both of those locations if a coated electrode with a composite tubular core is used.

I also provide a carbon-containing nickel base metal electrode for forming a wear-resistant weld deposit, the electrode containing as a component at least one of the materials of the group consisting of titanium, titanium alloy, titanium carbide and oxide of titanium, alone or combined with another oxide, such component containing titanium in an amount between about 1% and about 22% by weight of the electrode metal, and also containing as a component a carbide forming material in an amount sufficient to render both carbon and titanium soluble in the nickel, said carbide forming material comprising at least one of the materials of the group consisting of chromium, iron, manganese, molybdenum, tungsten, vanadium, columbium and silicon in an amount sufficient to produce a carbide former equivalent of at least 3% by weight of the electrode metal and also containing as a component carbon to form titanium carbide particles by crystallization in situ from the weld metal produced by the electrode, the carbon being present in an amount at least equal to the total of (1) the amount of carbon required to form the titanium carbide particles plus (2) the amount of carbon required to reduce titanium oxide and other metal oxides reducible by carbon if present plus (3) the amount of carbon required to combine with oxygen derived from the reaction zone atmosphere. As indicated above, such total amount of carbon is preferably equal to between about .7% and about 12% by weight of the electrode metal.

The wear resistance of a hard facing deposite improves as the quantity of titanium carbide increases. This has been demonstrated by wear testing apparatus using standard abrasive paper. The increase in wear resistance is small for concentrations of carbide less than about .1%. This lower limit of 1% of the weight of the deposit is the effective threshold value at which significant increases in wear resistance begin. Above 1% titanium carbide the improvement is marked and the ability of the welding operation to produce titanium carbide in the deposit sets a maximum practical limit of about 20% titanium carbide by weight of the deposit. This maximum value coincidentally falls in the lower range where the deposit begins to assume the mechanical properties of the carbide rather than of the matrix and to lose some of its metallic characteristics such as ductility.

For the purposes of calculating the amount of titanium to be added as electrode metal is has been found in the practice of this invention as well as in the practice of the invention disclosed in my said copending application that the recovery of titanium as titanium carbide in the weld deposit is on the order of ¾ of the titanium added as electrode metal. This recovery factor indicates that from 1% to about 22% titanium by weight of electrode metal produces between about .8% and about 16% titanium in the weld deposit.

The computations of carbon required in the welding electrodes system must account for carbon used for these objectives: (1) forming titanium carbide, (2) reducing titanium oxide and other metal oxides reducible by carbon if present and (3) sacrificial protection against the atmosphere if oxidizing. As stated above the matrix in a nickel base system has slight requirement for carbon as such, so that the above listed three objectives are the only ones with which I need be concerned. Carbon used in excess of the amount required to fill these three objectives, whether introduced deliberately or otherwise, is essentially wasted and is not considered in the calculation of required carbon.

In general, computation of the amounts of carbon and titanium required in the electrode to produce the desired titanium carbide in the resulting weld deposit are performed in a manner similar to those disclosed in my said copending application, the important difference in the present invention being the need for modifying the nickel weld metal pool so that it will dissolve both the titanium and the necessary carbon for precipitation of titanium carbide in situ.

Listed in the table below are three nickel base weld deposits which serve to illustrate the importance of the carbide former equivalent (CFE) values:

| Deposit Number | Nominal Composition | | | | | | Microstructure | Weight loss in milligrams[1] |
|---|---|---|---|---|---|---|---|---|
| | Fe, percent | Ti, percent | C, percent | Cr, percent | Ni, percent | CFE, percent | | |
| 1 | 1.5 | 1 | 1.5 | 1.0 | Bal. | 1.45 | Graphite and austenite | 500 |
| 2 | 1.5 | 1 | 1.5 | 2.5 | Bal. | 2.95 | Small amount TiC plus graphite in austenite. | 341 |
| 3 | 1.5 | 1 | 1.5 | 5.0 | Bal. | 5.45 | Titanium carbide in austenite | 291 |

[1] Weight loss in wear test using apparatus with standard abrasive paper and standard conditions. The weight loss is a measure of wear resistance; the less the weight loss, the better the wear resistance.

This table demonstrates that by maintaining the carbide former equivalent (CFE) above about 3% minimum an alloy can be formed with the nickel in the molten weld metal pool which will dissolve the carbon and thus allow it to precipitate out as titanium carbide.

The improvement in wear resistance in a typical nickel base weld deposit produced by the use of titanium carbide precipitated in situ in the deposit is shown by comparative tests. An electrode was fabricated using an 80% nickel-20% chromium core wire to which was applied a coating the composition of which is listed below. The coating was 20.7% of the total electrode weight.

| | Parts by weight |
|---|---|
| Graphite | 35 |
| Amorphous boron | 40 |
| Calcium carbonate | 30 |
| Calcium fluoride | 50 |
| Sodium aluminum fluoride | 50 |
| Iron boron alloy (18% boron) | 50 |
| Titanium silicon alloy (40% titanium) | 90 |
| Silicate binder | 70 |

The deposit resulting from use of the electrode had a weight loss in the standard wear test of 271.0 milligrams and contained about 3.75% titanium carbide. A similar electrode from which the titanium content was omitted and whose deposit contained no titanium carbide showed a weight loss of 456 milligrams in the standard wear test.

While I have described certain present preferred embodiments of my invention and a certain present preferred method of practicing the same it is to be distinctly understood that the invention is not limited thereto but may be otherwise variously embodied and practiced within the scope of the following claims.

I claim:

1. A method of forming a wear-resistant weld deposit comprising forming in an arc welding reaction zone a nickel base weld metal pool, introducing into the reaction zone a component comprising at least one of the materials of the group consisting of titanium, titanium alloy, titanium carbide and oxide of titanium, alone or combined with another oxide, such component containing titanium in an amount between about .8% and about 16% by weight of the weld deposit, introducing into the reaction zone a carbide forming material in an amount sufficient to render both carbon and titanium soluble in the nickel, said carbide forming material comprising at least one of the materials of the group consisting of chromium, iron, manganese, molybdenum, tungsten, vanadium, columbium and silicon in an amount sufficient to produce a carbide former equivalent of at least 3% by weight of the weld deposit and maintaining in the reaction zone an amount of carbon at least equal to the total of (1) the amount of carbon required to form the titanium carbide particles plus (2) the amount of carbon required to reduce titanium oxide and other metal oxides reducible by carbon if present plus (3) the amount of carbon required to combine with oxygen derived from the reaction zone atmosphere and thereby forming titanium carbide particles by crystallization in situ the solidifying weld metal which forms the matrix.

2. A method of forming a wear-resistant weld deposit comprising forming in an arc welding reaction zone a nickel base weld metal pool, introducing into the reaction zone a component comprising at least one of the materials of the group consisting of titanium, titanium alloy, titanium carbide and oxide of titanium, alone or combined with another oxide, such component containing titanium in an amount between about 1% and about 22% by weight of the electrode metal, introducing into the reaction zone a carbide forming material in an amount sufficient to render both carbon and titanium soluble in the nickel, said carbide forming material comprising at least one of the materials of the group consisting of chromium, iron, manganese, molybdenum, tungsten, vanadium, columbium and silicon in an amount sufficient to produce a carbide former equivalent of at least 3% by weight of the electrode metal and maintaining in the reaction zone an amount of carbon at least equal to the total of (1) the amount of carbon required to form the titanium carbide particles plus (2) the amount of carbon required to reduce titanium oxide and other metal oxides reducible by carbon if present plus (3) the amount of carbon required to combine with oxygen derived from the reaction zone atmosphere and thereby forming titanium carbide particles by crystallization in situ in the solidifying weld metal which forms the matrix.

3. A method of forming a wear-resistant weld deposit comprising forming in an arc welding reaction zone a nickel base weld metal pool, introducing into the reaction zone a component comprising at least one of the materials of the group consisting of titanium, titanium alloy, titanium carbide and oxide of titanium, alone or combined with another oxide, such component containing titanium in an amount between about 1% and about 22% by weight of the electrode metal, introducing into the reaction zone a carbide forming material in an amount sufficient to render both carbon and titanium soluble in the nickel, said carbide forming material comprising at least one of the materials of the group consisting of chromium, iron, manganese, molybdenum, tungsten, vanadium, columbium and silicon in an amount sufficient to produce a carbide former equivalent of at least 3% by weight of the electrode metal and maintaining in the reaction zone an amount of carbon at least equal to the total of (1) the amount of carbon required to form the titanium carbide particles plus (2) the amount of carbon required to reduce titanium oxide and other metal oxides reducible by carbon if present plus (3) the amount of carbon required to combine with oxygen derived from the reaction zone atmosphere, such total amount of carbon being equal to between about .7% and about 12% by weight of the electrode metal and thereby forming titanium carbide particles by crystallization an situ in the solidifying weld metal which forms the matrix.

4. A method of forming a wear-resistant weld deposit comprising forming in an arc welding reaction zone a nickel base weld metal pool, introducing into the reaction zone a component comprising at least one of the materials of the group consisting of titanium, titanium alloy, titanium carbide and oxide of titanium, alone or combined with another oxide, such component containing titanium in an amount between about .8% and about 16% by weight of the weld deposit, introducing into the reaction zone a carbide forming material in an amount sufficient to render both carbon and titanium soluble in the nickel, said carbide forming material comprising at least one of the materials of the group consisting of chromium, iron, manganese, molybdenum, tungsten, vanadium, columbium and silicon in an amount sufficient to produce a carbide former equivalent of at least 3% by weight of the weld deposit and maintaining in the reaction zone an amount of carbon at least equal to the total of (1) the amount of carbon required to form the titanium carbide particles plus (2) the amount of carbon required to reduce titanium oxide and other metal oxides reducible by carbon if present plus (3) the amount of carbon required to combine with oxygen derived from the reaction zone atmosphere, such total amount of carbon being equal to between about .2% and about 4% by weight of the weld deposit, and thereby forming titanium carbide particles by crystallization in situ in the solidifying weld metal which form the matrix.

5. A carbon-containing nickel base metal electrode for forming a wear-resistant weld deposit, the electrode containing as a component at least one of the materials of the group consisting of titanium, titanium alloy, titanium carbide and oxide of titanium, alone or combined with another oxide, such component containing titanium in an amount between about 1% and about 22% by weight of the electrode metal, and also containing as a component a carbide forming material in an amount sufficient to render both carbon and titanium soluble in the nickel, said carbide forming material comprising at least one of the materials of the group consisting of chromium, iron, manganese, molybdenum, tungsten, vanadium, columbium and silicon in an amount sufficient to produce a carbide former equivalent of at least 3% by weight of the electrode metal and also containing as a component carbon to form titanium carbide particles by crystallization in situ from the weld metal produced by the electrode, the carbon being present in an amount at least equal to the total of (1) the amount of carbon required to form the titanium carbide particles plus (2) the amount of carbon required to reduce titanium oxide and other metal oxides reducible by carbon if present plus (3) the amount of carbon required to combine with oxygen derived from the reaction zone atmosphere.

6. A carbon-containing nickel base metal electrode for forming a wear-resistant weld deposit, the electrode containing as a component at least one of the materials of the group consisting of titanium, titanium alloy, titanium carbide and oxide of titanium, alone or combined with another oxide, such component containing titanium in an amount between about 1% and about 22% by weight of the electrode metal, and also containing as a component a carbide forming material in an amount sufficient to render both carbon and titanium soluble in the nickel, said carbide forming material comprising at least one of the materials of the group consisting of chromium, iron, manganese, molybdenum, tungsten, vanadium, columbium and silicon in an amount sufficient to produce a carbide former equivalent of at least 3% by weight of the electrode metal and also containing as a component carbon to form titanium carbide particles by crystallization in situ from the weld metal produced by the electrode, the carbon being present in an amount at least equal to the total of (1) the amount of carbon required to form the titanium carbide particles plus (2) the amount of carbon required to reduce titanium oxide and other metal oxides reducible by carbon if present plus (3) the amount of carbon required to combine with oxygen derived from the reaction zone atmosphere, such total amount of carbon being equal to between about .7% and about 12% by weight of the electrode metal.

No references cited.

RICHARD M. WOOD, *Primary Examiner.*

B. A. STEIN, *Assistant Examiner.*

UNITED STATES PATENT OFFICE
CERTIFICATE OF CORRECTION

Patent No. 3,398,256                                  August 20, 1968

William R. Foley, Jr.

It is certified that error appears in the above identified patent and that said Letters Patent are hereby corrected as shown below:

Column 1, line 29, "along" should read -- alone --. Column 3, line 23, beginning with "CFE" cancel all to and including "percent V" in line 25, same column 3, and insert -- CFE=%Cr+%Mo+%W+%Cb+.3x%Fe+.6x%Mn+.6x%Si+1.5x%V. --. Column 4, line 5, "deposite" should read -- deposit --; line 32, "electrodes" should read -- electrode --. Column 5, line 52, before "the" insert -- in --. Column 6, line 33, "an" should read -- in --; line 62, "form" should read -- forms --.

Signed and sealed this 13th day of January 1970.

(SEAL)

Attest:

Edward M. Fletcher, Jr.                               WILLIAM E. SCHUYLER, JR.

Attesting Officer                                           Commissioner of Patents